United States Patent [19]

Baldenko et al.

[11] Patent Number: 4,585,401

[45] Date of Patent: Apr. 29, 1986

[54] MULTISTAGE HELICAL DOWN-HOLE MACHINE WITH FRICTIONAL COUPLING OF WORKING ELEMENTS, AND METHOD THEREFOR

[75] Inventors: Dmitry F. Baldenko; Jury V. Vadetsky; Moisei T. Gusman, all of Moscow; Anatoly M. Kochnev; Samuil S. Nikomarov, both of Perm; Valery I. Semenets; Jury K. Tolsky, both of Moscow; Jury V. Zakharov, Perm; Valerian P. Shumilov, Moscow, all of U.S.S.R.

[73] Assignee: Veesojuzny Ordena Trudovogo Krasnogo Znameni Naucho-Issle, Moscow, U.S.S.R.

[21] Appl. No.: 578,625

[22] Filed: Feb. 9, 1984

[51] Int. Cl.⁴ ..................... F04C 2/00; B23P 15/00
[52] U.S. Cl. ........................ 418/5; 29/156.4 R; 29/434; 403/333; 403/334; 403/361; 418/48
[58] Field of Search .............. 418/5, 48; 403/333, 403/334, 361; 29/156.4 R, 240.5, 434, 435

[56] References Cited

U.S. PATENT DOCUMENTS

| | | | |
|---|---|---|---|
| 524,033 | 8/1894 | Turner | 403/333 |
| 1,849,510 | 3/1932 | Thomson | 403/333 |
| 2,600,946 | 6/1952 | Voedisch | 403/333 |
| 3,912,426 | 10/1975 | Tschirky | 418/48 |
| 3,999,901 | 12/1976 | Tschirky | |
| 4,011,917 | 3/1977 | Tiraspolsky et al. | 418/48 |

FOREIGN PATENT DOCUMENTS

| | | | |
|---|---|---|---|
| 946386 | 7/1956 | Fed. Rep. of Germany | 418/5 |
| 2418967 | 10/1975 | Fed. Rep. of Germany | 418/48 |
| 2084697 | 4/1982 | United Kingdom | 418/48 |

Primary Examiner—John J. Vrablik
Assistant Examiner—Theodore W. Olds
Attorney, Agent, or Firm—McAulay, Fields, Fisher, Goldstein & Nissen

[57] ABSTRACT

A helical down-hole machine comprises a plurality of sections, each such section having a helical rotor and a helical stator arranged with a preselected eccentricity to form cavities of variable volume for the passage of fluid therethrough and positioned axially in series. The identical elements of these sections, rotors or stators, are rigidly interconnected. The rigid connection of at least one of these identical elements of said sections is detachable by frictionally jointing a projection provided at the end of one such element and a recess provided at the end of the adjacent element to be secured against relative angular and axial displacements in the process of rotation.

22 Claims, 14 Drawing Figures

MULTISTAGE HELICAL DOWN-HOLE MACHINE WITH FRICTIONAL COUPLING OF WORKING ELEMENTS, AND METHOD THEREFOR

This invention relates to drilling technology, and more specifically to helical down-hole machines.

The down-hole machine embodying the present invention may be used with advantage to drive rock-breaking tools in oil and gas drilling, The machine may operate as a motor, drilling oil and gas wells, cleaning pipes and bottom-hole milling, i.e. when it is necessary to employ it as a drive motor to the output shaft of which a bit is attached, and as a pump, particularly for oil recovery, lifting water or pumping other fluids.

There are known helical down-hole machines comprising a plurality of sections arranged longitudinally in series, each of the sections having rotor and stator elements mounted with a preselected eccentricity and adapted to cooperate during operation.

Each stator includes a metal housing having bonded to the inner walls thereof an elastic lining. The surface of the lining facing the rotor is helically grooved. The metal rotor disposed inside the stator is likewise provided with helical grooves on the outer surface, the number of grooves being one less than the number of grooves on the stator.

The helical grooves of the stator and rotor form cavities of variable volume for the passage of fluid therethrough.

The working fluid forced to flow between the stator and the rotor fills the closed cavities and acts on the helical grooves of the rotor causing the rotor to rotate.

In the herein described construction of the helical down-hole machine the stators are arranged in series and fixedly interconnected. In turn, the rotors disposed inside the stators are likewise in series—positioned and fixedly interconnected to form a string of such rotors, the last rotor in the sequence being attached by means of a universal joint to an output shaft which is made hollow (cf., e.g., U.S. Pat. No. 3,999,901).

The above arrangement of the rotors and the stators provides for the working fluid to flow from the first section to the second section and further through any number of successive sections to pass the last section in succession and be conveyed via the hollow shaft and a drill bit to the bottom hole.

The stators are interconnected by means of two adapters each of which is threadingly engaged with the corresponding stator, whereas the adapters are jointed together by welding. Several rotors placed inside the corresponding stators are also weld-joined to form an integral rotor string with a continuous helical groove which on each successive rotor is actually a continuation of the helical groove made on the preceding rotor thus enabling to make up a string of any desired number of sections.

In the heretofore described helical down-hole machine the assembly of stator-rotor units into integral groups by connecting them rigidly requires that not only coaxiality of the elements be observed, but also the continuity of the helical surfaces of the elements making up each group be maintained. This is attained by using special conductors facilitating the assembly and by strictly following the prescribed sequence of assembly. Special care must be taken to fix the rotors and stators in proper position prior to weld-jointing them into groups. Described below is a sequence to be followed for assembling the stators into an integral group:

(1) Adapters are screwed into the metal housings of the stators to be connected, the free ends of the adapters having mating surfaces to facilitate subsequent connection and welding.

(2) The stators to be connected are assembled through the screwed adapters until the ends of mating surfaces meet on the adapter having a continuous helical surface conforming the geometry of the elastic lining of the stator.

(3) Location marks to guide the assembly are put on the metal housings of the stators and on the adapters.

(4) The adapter is then removed to be followed by disconnecting the adapters from each of the stators, whereafter they are reconnected by the mating surfaces according to the location marks made, special attention being paid to aligning the location marks. The adapters are then weld-joined.

(5) The stators are screwed onto each threaded free end of the thus assembled adapters, special care again being taken to align the location marks.

The rotors are put together in an integral group in a substantially similar manner.

In view of the above described, the assembly of indentical elements into an integral group by connecting them rigidly requires the use of special conductors and takes numerous operations, the reliability and extended life of the machine therefore being totally dependent on the accuracy of marking and the alignment of the location marks during assembly.

In addition, declined performance of the machine after a certain period of operation requires replacement of the stators and rotors, which results in substantial labour expenditures due to the complexity of joining identical elements into sections and the integrity of the rigid connections.

Similar difficulties arise when it is necessary to replace a damaged or malfunctioning stator or rotor, which requires that every assembly operation be repeated. Such a replacement also requires the repeated preparation of mating surfaces on the adapters to be joined.

The assembly operations are not in the least simplified when an integral or long rotor is used to facilitate the preliminary operation, such as marking the adapters connecting the stators. Therefore, all the subsequent operations including joining together the rotors are conducted in the manner described heretofore.

It is an object of this invention to simplify the manufacturing assembly of a helical down-hole machine.

Another object is to make the machine more reliable in operation.

One more object is to make the machine more durable, that is to extend its service life.

These and other objects and attending advantages are attained by a helical down-hole machine wherein a plurality of sections having a helical rotor and a helical stator are arranged with a preselected eccentricity to form cavities of variable volume for the passage of fluid therethrough. The sections are disposed in series axially, with identical elements of these sections being rigidly interconnected. According to the invention, the rigid connection of at least one of these identical elements is detachable through the use of friction coupling fashioned as a projection-and-recess assembly. The projection has the form of a body of revolution provided at the end of one of the elements of the section. The recess is provided at the end of the adjacent element of the section and has a shape conforming to the shape of the projection. The connection is such that assembly is secured against angular and axial displacements by a forcibly induced external force.

Preferably, the projection and the recess are provided at the ends of adjacent rotors.

In this case the external force will be induced during operation of the machine by virtue of forces produced under the action of a pressure drop acting also on the rotors.

The above arrangement is recommended for machines of small diameter.

When there is no limitations with respect to the diameter of helical down-hole machines, it is advisable to provide the projection and the recess at the ends of adjacent stators. Therewith, in order to prevent the stators from relative angular and axial displacements, they are enclosed by a housing having at the ends thereof thrust elements engageable with the free ends of the stators, at least one of the thrust elements being capable of axial movement thanks to which an external force is provided to prevent axial and angular displacements of the stators being connected.

Preferably, the projection and the recess of identical mating elements are cylindrical in shape.

Such an arrangement is advantageous because it is the most simple in manufacturing.

It is not less advantageous to use as the mating arrangement of the projection and the recess on identical elements, stators or rotors, of which are made in the form of truncated cones, which improves the reliability of connection.

Still more advantageous is to make the projection and the recess in the form of a cylinder terminating in a truncated cone.

Such a mating arrangement assures reliable connection of elements and considerably improves the capacity to transmit torque from one section to the adjacent one.

The arrangement of the mating surfaces of the recess-and-projection assembly is the best when they have the form of a cylinder expanding to a truncated cone with the difference between the diameters of the larger and smaller bases of the truncated cone being not less than four eccentricities.

This modification, apart from assuring reliable connection, facilitates joining the elements together in that the projection with a small cone base easily enters the recess.

The helical down-hole machine according to the invention provides for joining together mating elements automatically.

In view of the foregoing, the detachable connections make it possible to shorten the time required to assemble a required number of sections. They further facilitate dismantling of the sections and replacement of faulty elements without resorting to the use of special auxiliary means, or increasing the number of operations required.

The invention will now be described in greater detail with reference to various specific embodiments thereof taken in conjunction with the accompanying drawings, in which:

FIG. 1 is a sectional longitudinal view of a helical down-hole machine according to the invention;

FIG. 1a' is a continuation of FIG. 1;

FIG. 1a" is a continuation of FIG. 1a';

Figure 3:
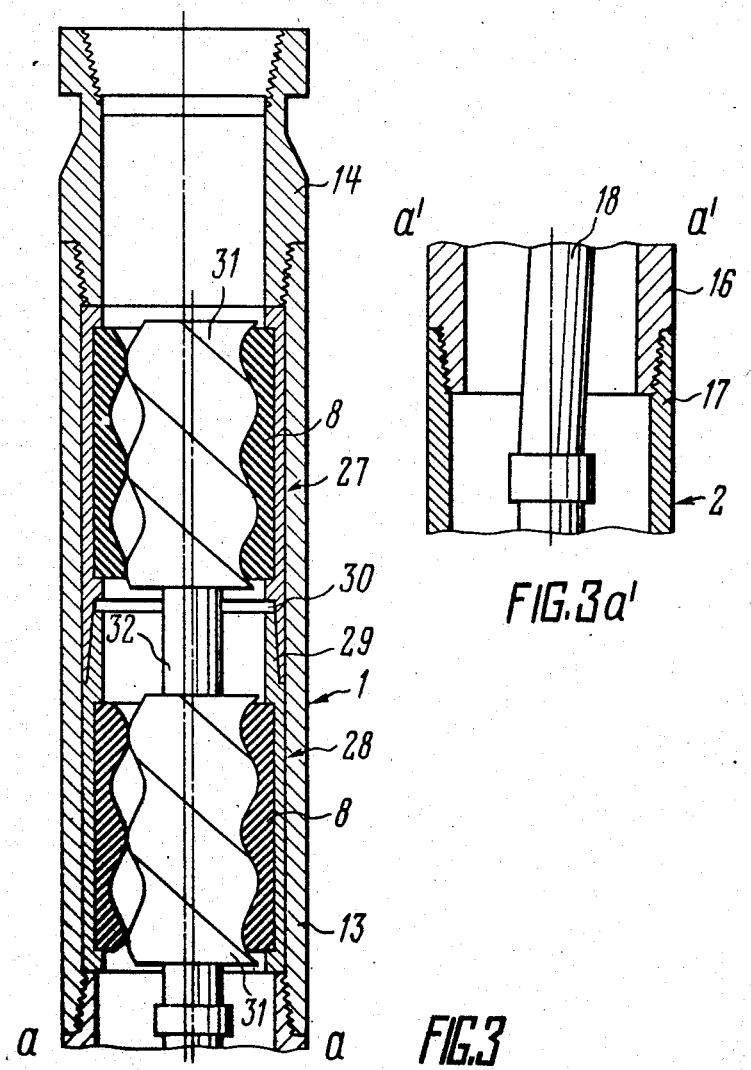
FIG. 3 is a longitudinal sectional view of a modified form of the helical down-hole machine according to the invention wherein projection-and-recess assembly having the form of a truncated cone are arranged at the ends of adjacent stators.
Figure 4:
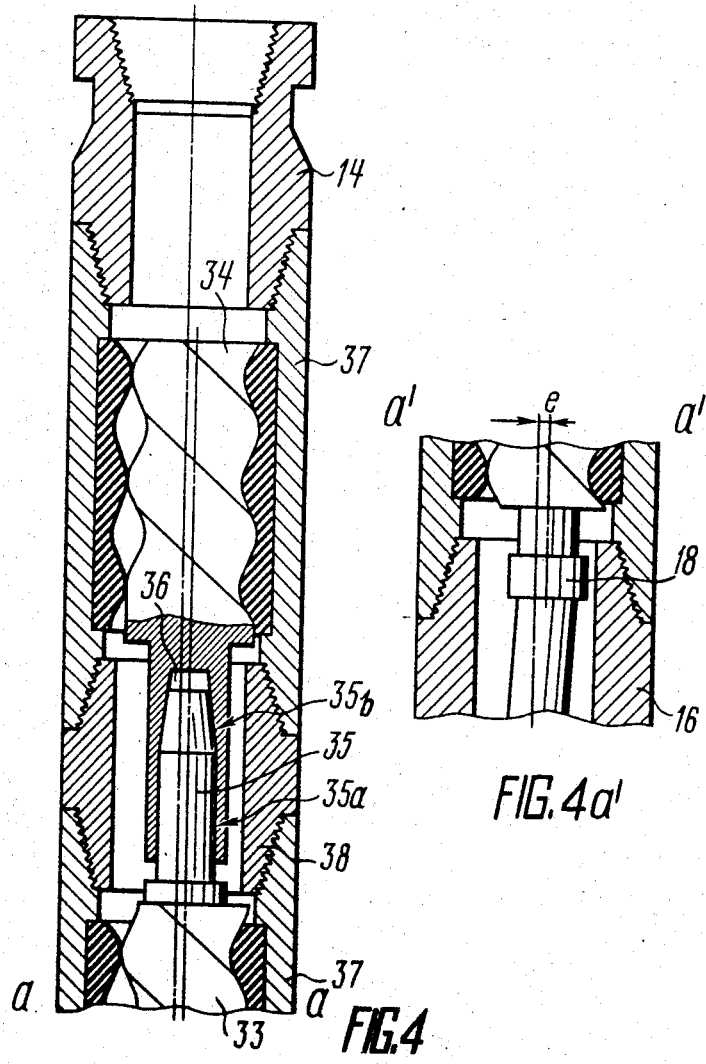
Figure 5:
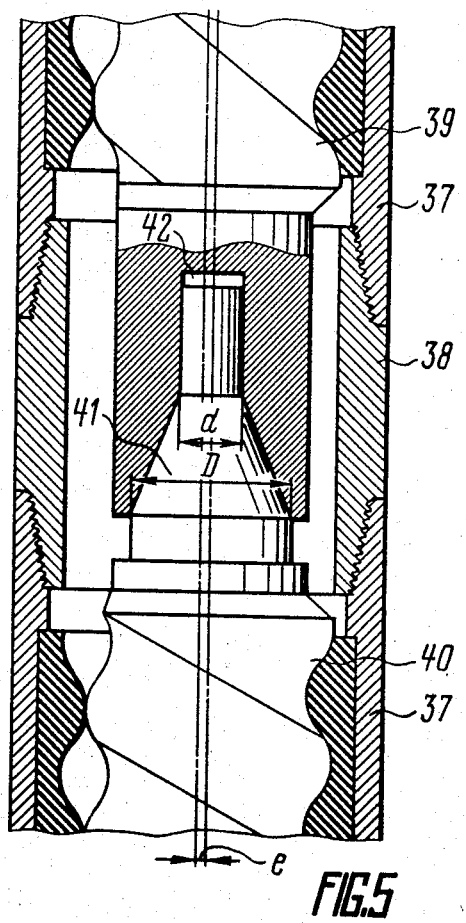
Figure 6:
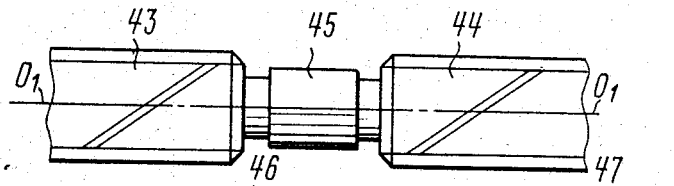
Figure 7:
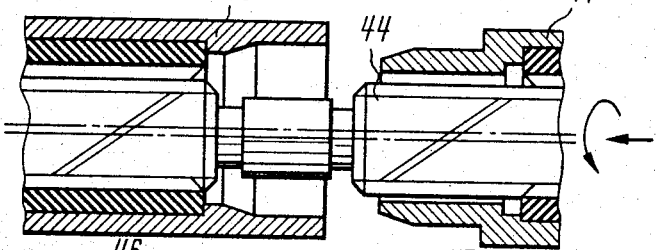

FIG. 3a' is a continuation of FIG. 3;

FIG. 4 shows a longitudinal sectional view of a modification wherein projection-and-recess assembly at the ends of rotors have the form of a cylinder terminating in a truncated cone;

FIG. 4a' is a continuation of FIG. 4;

FIG. 5 illustrates a longitudinal section of connection between the rotors fashioned as a projection-and-recess assembly in the form of a cylinder expanding to a truncated cone, the difference between the diameters of the large and small bases of the cone being not less than four values of the eccentricity; and FIGS. 6 to 10 show the sequence of assembling identical elements to be rigidly connected by means of projection-and-recess assembly having the form of a cylinder terminating in a truncated cone.

Figure 1:
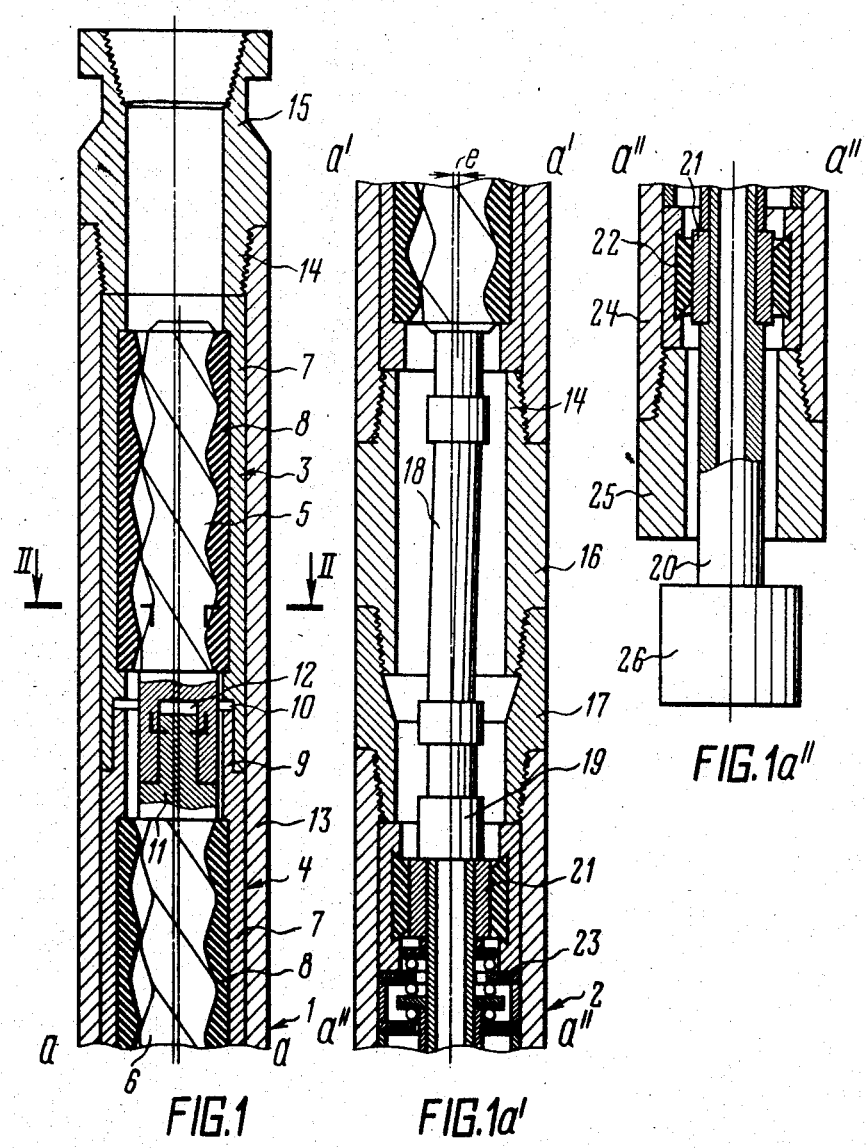

The helical down-hole machine is comprised of arranged axially in series two sections 1 (FIG. 1) and a spindle assembly 2. Each section 1 has a stator 3 (4) and rotor 5 (6) arranged with a preselected eccentricity "e". The stators 3, 4 and the rotors 5, 6 are rigidly connected therebetween. Each of the stators 3 and 4 has a metal housing 7 with an elastic lining 8 bonded to the inner surface thereof. The lining 8 is formed having shaped thread or grooves. The outer surface of the metal rotors 5 and 6 also have shaped thread or grooves, the number of such grooves on the rotors being one less than those on the shaped elastic lining 8 of the stator.

The rigid interconnection of the stators 3 and 4 is detachable for which purpose the adjacent ends of the stators 3 and 4 are provided with a recess-and-projection linkage. More particularly, the stator 4 has a projection 9 in the form of a body of revolution, whereas the stator 3 has a recess 10 of a corresponding shape.

The rigid interconnection between the rotors 5 and 6 is executed in a substantially similar manner, viz. by providing a projection 11 in the form of a cylinder at the rotor 6 and a recess 12 of a shape to receive the projection 11 at the end of the rotor 5.

The rotors 5 and 6 are forcibly held together in the course of rotation by virtue of an axial load arising due to a pressure drop. In order to prevent the stators 3 and 4 from angular and axial displacements, they are enclosed by a casing 13 and are held against relative angular and axial displacements by an axial force produced by axially movable thrust elements 14 arranged on adapters 15 and 16. The adapters 15 and 16 are threadingly connected to the casing 13, which makes it possible to move them axially to thereby produce a required clamping effect on the thrust elements 14.

The adapter 16 is connected by the lower portion thereof to an adapter 17 of the spindle assembly 2. Arranged inside the adapter 16 is a double-hinged coupling 18 intended to connect the lower rotor 6 with sleeve 19 of the output shaft 20 of the spindle assembly 2.

The sleeve 19 holds on the shaft 20 sleeves 21 of radial bearings 22 and a thrust bearing 23. The radial bearings 22 and the thrust bearing 23 are secured along their outer surfaces in a casing 24 between the adapter 17 and a nipple 25. In its lower portion the shaft 20 terminates in an adapter 26 serving to be connected to a bit (not shown).

Figure 2:
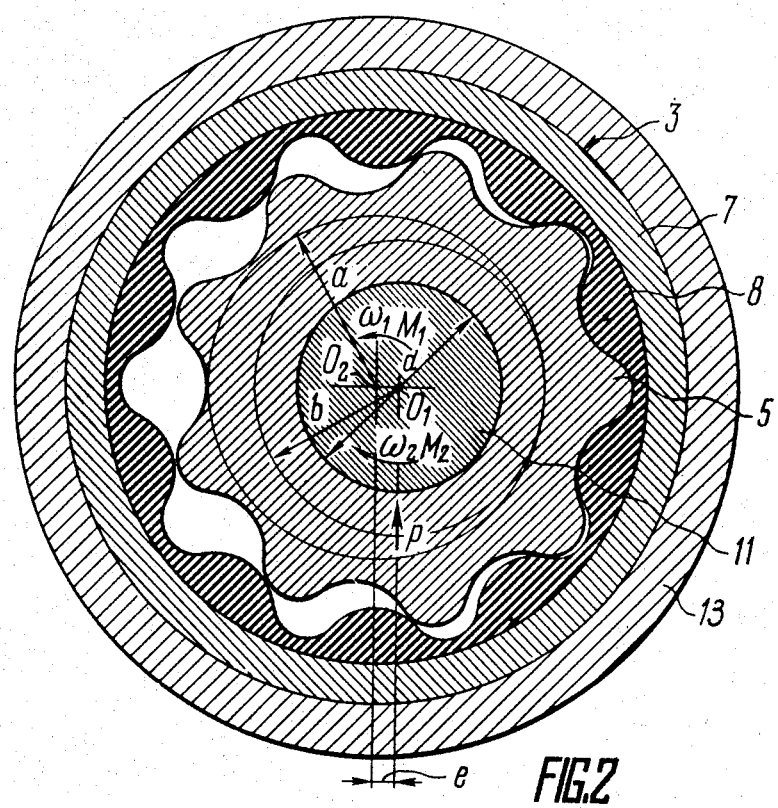
FIG. 2 is an enlarged cross-section taken along the line II—II in FIG. 1.

With reference to FIG. 2 there is shown a cross-sectional view of the section 1. The stator 3 is in meshing engagement with the rotor 5. The planetary motion of the rotor 5 inside the elastic lining 8 of the stator 3 may be described as rolling without slippage of the initial circle of the rotor 5 of a radius $b=ez$ in the initial circle of the stator 3 of a radius $a=e(z+1)$, where e is the eccentricity equalling half the radial height of the helical grooves of the rotor 5 or the stator 3; and z is the number of helical grooves cut on the rotor 5. The initial circle of the rotor 5 has its center in the point $0_1$, while the initial circle of the stator 3 has its center in the point $0_2$.

In the heretofore described helical down-hole machine similar elements of the sections 1, i.e. stators 3, 4 and rotors 5, 6, are connected by means of detachable frictional coupling in the form of recess 10 (12) on one of these elements and projection 9 (11) on the adjacent element, both being shaped as cylinders.

Referring now to FIG. 3, there is shown a connection between stators 27 and 28 wherein projection 29 and recess 30 have the form of truncated cones thus enabling to improve the reliability of the detachable frictional coupling. The stator 27 and 28 are prevented from angular and axial displacements in the manner described above. Rotors 31 of these sections 1 are interconnected by means of assembly 32 (such as a spline coupling which provides for their rigid connection and prevents their relative angular displacment.

Identical elements, particularly rotors 33 (FIG. 4) and 34, are connected by a detachable friction coupling; more precisely, by means of a projection 35 arranged on the rotor 33 and having the form of a cylinder 35a terminating in a truncated cone 35b, and a corresponding recess 36 made in the rotor 34. Stators 37 are interconnected in this modified form of connection by means of an adapter 38. Otherwise, the helical down-hole machine is analogous to the modification thereof described heretofore.

With reference to FIG. 5, in order to assure a more reliable connection of rotors 39 and 40 having projections 41 and recesses 42 in the form of cylinders expanding to truncated cones, it is preferable that the diameter d of the smaller bse of the truncated cone be less than the diameter D of the larger base thereof by a value being not less than four eccentricities "e", i.e. $D-d \leq 4e$.

FIGS. 6 to 10 represent a sequence of operations for positioning rotors and stators during assembly, the rigid connection therebetween being effected by means of detachable recess-and-projection assemblies.

Prior to explaining the operation of the helical down hole machine, the manner in which similar elements thereof are put together by means of the rigid detachable friction connection of the recess-and-projection type is to be elaborated.

The initial step of assembly includes connecting in series the rotors 43 (FIG. 6) and 44 to form a string by means of any of the heretofore described rigid detachable connections. In this particular case the rotors 43, 44 aligned along a common axis $0_1$ $0_1$ are joined together by a conical spline coupling 45, whereupon stators 46 (FIG. 7) and 47 are mounted on the thus joined rotors on opposite ends.

Figure 8:
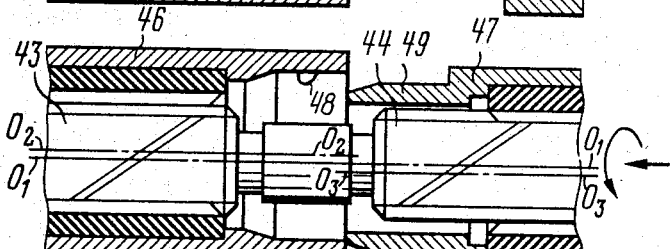
Figure 9:
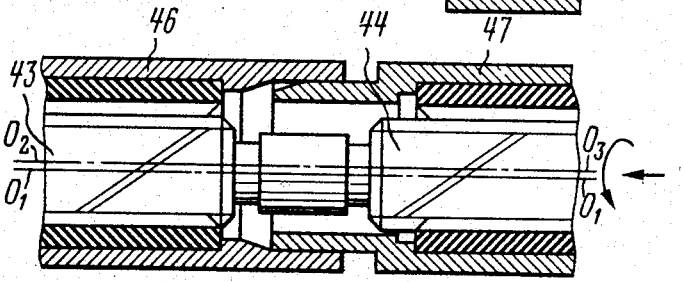

After the stator 46 assumes working position, the stator 47 is rotated to threadingly engage with the rotor 44 and moved until it comes into contact with the stator 46. Therewith, as best seen in FIG. 8, the stators are put into contact by their end surfaces, the end of the stator 46 having a recess 48, the other stator 47 having a projection 49. The projection 49 and recess 48 are shaped as cylinders terminating in tapered cone portions.

Figure 10:
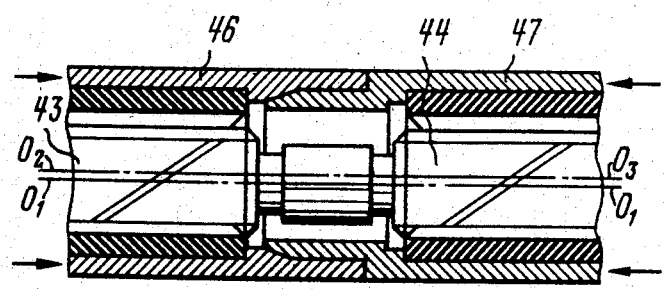

Referring now to FIG. 8, there is illustrated a situation where the mating surfaces of the rigid connection between the stators are not in registration, that is when the axes $0_2$ $0_2$ and $0_3$ $0_3$ of the stators 46, 47 are spaced apart from the common axis $0_1$ $0_1$ of the string of rotors 43, 44. In such a case one of the stators, particularly the stator 47, while rotating about the axis $0_1$ $0_1$ of the rotor 44 engaged therewith will tend to assume a position where its axis is aligned with the axis $0_2$ $0_2$ of the adjacent stator 46. In other words, both stators 46 and 47 have a common axis $0_2$ $0_3$ (FIG. 9), while the mating surfaces of the stators are not completely in contact.

the stator 47 must be so rotated to threadingly engage with the rotor 44 as to provide an axial force capable of moving the stator 47 toward the stator 46 fixedly mounted on the rotor 43 until the two stators are in complete mating engagement as seen in FIG. 10.

The helical down-hole machine embodying the present invention operates as follows.

When drilling fluid is supplied to the helical down-hole machine operating as a motor, the rotors 5 and 6 are caused to execute a planetary motion inside the elastic linings of the stators 3 and 4. This planetary motion, as has been explained with reference to FIG. 2, may be described kinematically as rolling without slippage of the initial circle of the rotor 5 of the radius $b=ez$ inside the initial circle of the stator 3 of the radius $a=e(z+1)$. The cross-sectional center $0_1$ of the rotor 5 executes translatory rotation relative to the cross-sectional center $0_2$ of the stator 3 to move over the circle of the radius "e" counterclockwise with the speed of rotation $\omega_1$, whereas the rotor 3 per se turns about its own axis clockwise with a speed of rotation $\omega_2$ (absolute rotation), with $\omega_1 = z \cdot \omega_2$.

Torques acting on the rotor 5 in translatory motion ($M_1$) and in absolute motion ($M_2$) relative to the stator 3 correlate in a reverse proportionality to the speed of rotation of these motions, i.e. $M_1 = (1/z)M_2$.

Because the mating surfaces of the frictional connection between the rotors 5, 6 and the recess 12 and projection 11 are coaxial with the helical surfaces of the rotors 5 and 6, a torque, i.e. the torque $M_1$, is transmitted from the upper rotor 5 to the lower rotor 6 in the course of their translatory motion. Transmission of this torque produces a radial force $P = M_1/(2e)$ acting from the female cylindrical surface of the recess 12 of the upper rotor 5 on the male cylindrical surface of the projection 11 of the lower rotor 6.

At minimum tolerances between the mating surfaces of the frictional connection these surfaces fail to displace angularly whereby the torque is transmitted without friction losses between the mating surfaces.

The total torque $M_1$ of all the rotors is imparted through their translational motion to the lower rotor 6. By means of the double-hinged coupling 18 this torque is taken off the lower rotor 6 to be transformed into the absolute torque $M_2$ at the output shaft 20 of the spindle assembly 2. Axial load is transmitted from the upper rotor 5 to the lower rotor 6 through end surfaces of the projection 11 and recess 12. The cylindrical surfaces of the projection 11 and those of the recess 12 also take up radial loads imparted by hydraulic skewing moments acting on the rotors 5 and 6 in a plane passing across the axes of the stator 3 (4) and rotor 5 (6). These loads tend to reduce the eccentricity at the lower end of the upper rotor 5, whereas at the upper end of the rotor 6 these loads act to increase the eccentricity due to their opposite direction. Interaction between the projection 11 and recess 12 eliminate harmful skewing effect, which facilitates stabilization of the rotor motion. The stators 3 and 4 interconnectd by the projection 9 and the recess 10 and secured in the casing 13 between th two thrust elements 14 on the adapters 15 and 16 take up a reactive torque moment imparted through the adapter 15 to the drill string.

A more reliable takeup and transmission of torque from the lower stator 28 (FIG. 3) to the upper stator 27 is effected in a modification where the projection 29 and the recess 30 of the friction coupling are fashioned as truncated cones. Still more advantageous is a friction coupling where the projection 35 and the recess 36 have the form of a cylinder 35a terminating in a truncated cone 35b. Such an arrangement facilitates fitting of the rotors 33 and 34 and makes the connection more monolithic. The axial load in this case is transmitted through the tapered surfaces of the projection 35 and recess 36, while torque is transmitted through the cylindrical and tapered surfaces.

In order to simplify disassembly of the machine, the value of taper angle of the mating surfaces is preferably in excess of the angle of friction of the materials of the projection and recess.

The helical down-hole machine according to the invention features automatic aligning of the rotors in working position and simplified disassembly.

In addition, the machine provides for improved operating conditions of the stators and rotors because, on the one hand, radial forces resulting from intermediate shafts are obviated while, on the other hand, the construction of the friction couplings, particularly those of the rotors, makes it possible to mutually compensate oppositely directed radial forces arising from hydraulic skewing moments acting on the rotors. The foregoing improves the reliability of the machine and makes it more durable.

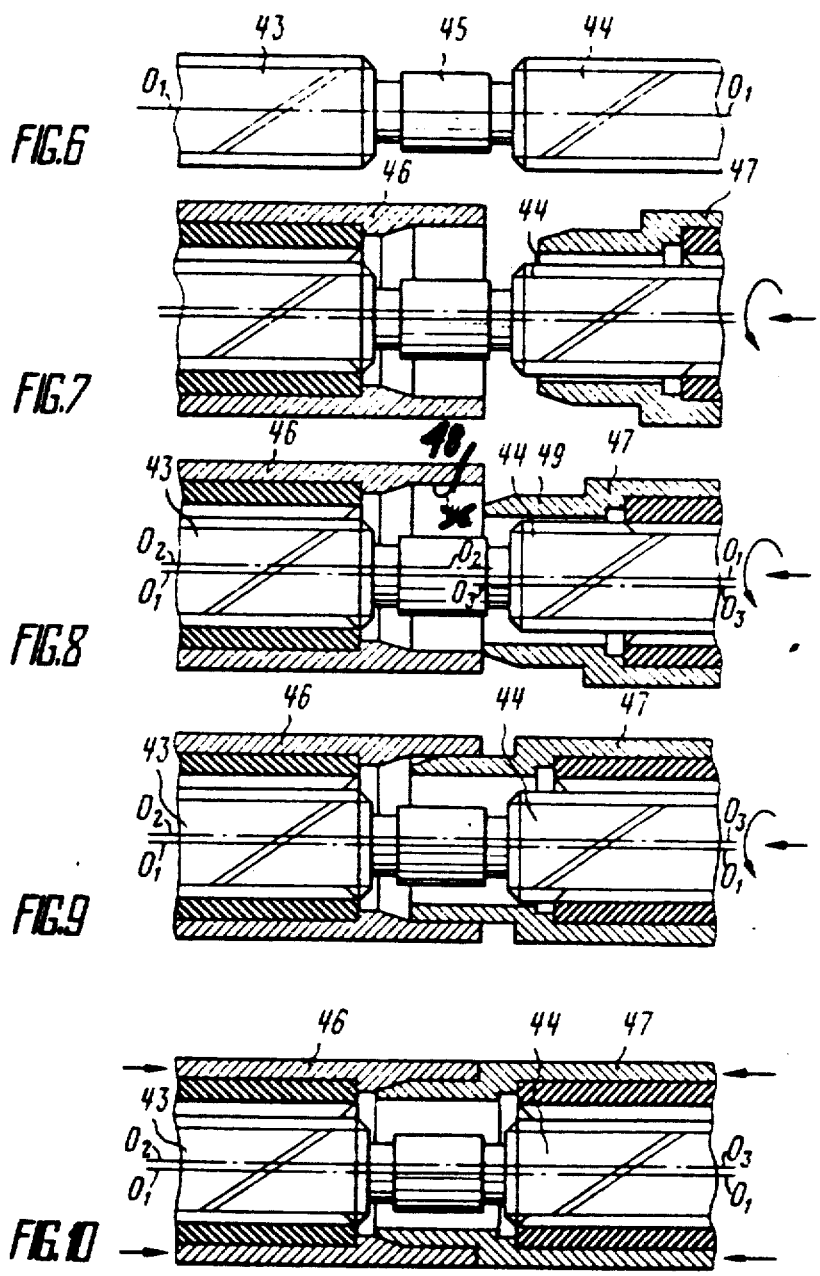

What is claimed is:

1. A multistage helical down-hole machine comprising:
    a plurality of sections arranged in series axially, each of said sections comprising a helical stator formed of a metal housing having an elastic lining with shaped grooves secured to the inner surface of said housing, and a helical rotor having grooves adapted to meshingly engage with the grooved lining of said stator;
    each of said stators having an axis aligned with the axis of said housing, and each of said engaged rotors having an axis non-aligned with the axis of said housing;
    the stators of adjacent sections being rotatably movable relative to one another from an initial position where the respective axes of adjacent stators are non-aligned to a final position where the respective axis of said stators are aligned to form a common axis during jointing of said stators together;
    the helical stator of each of said sections being rigidly connected directly to the helical stator of the next adjacent one of said sections to form a first set of succeedingly connected helical elements;
    the helical rotor of each of said sections being rigidly connected directly to the helical rotor of the next adjacent one of said sections to form a second set of succeedingly connected helical elements, the respective axes of said jointed rotor elements being aligned to form a common axis;
    said helical stators and rotors of said sections being arranged with a preselected eccentricity to define cavities of variable volume for the passage of fluid therethrough;
    a shaft kinematically linked with the helical rotor of the last of said sections; and
    the rigid connection of at least one of the sets of identical succeedingly connected helical elements of said sections being detachable through frictionally jointing a projection in the form of a body of revolution provided at the end of one of said elements and a recess of a corresponding shape provided at the end of said adjacent element forcibly secured against angular and axial displacements of said elements relative to one another.

2. A helical down-hole machine as defined in claim 1 wherein said projection and recess are provided at the ends of adjacent rotors and forcibly interconnected to resist relative displacement of said rotors during rotation by virtue of a pressure drop acting on said rotors.

3. A helical down-hole machine as defined in claim 1 wherein said projection and recess are provided at the ends of adjacent stators, said stators being secured against relative angular and axial displacements by placing them inside a common housing having at the ends thrust elements interacting with the free ends of said stators, at least one of said thrust elements being capable of axial movement.

4. A helical down-hole machine as defined in claim 1 wherein said projection and recess are cylindrical in shape.

5. A helical down-hole machine as defined in claim 1 wherein said projection and recess are shaped as truncated cones.

6. A helical down-hole machine as defined in claim 1 wherein said projection and recess are each shaped as a cylinder expanding into a truncated cone.

7. A helical down-hole machine as defined in claim 5 wherein the difference between the larger and smaller bases of the truncated cone amounts to at least a value not less than four values of the eccentricity.

8. A helical down-hole machine as defined in claim 6 wherein the difference between the larger and smaller bases of the truncated cone amounts to at least a value not less than four values of the eccentricity.

9. A multistage helical down-hole machine, comprising:
    a plurality of sections each arranged in series axially;
    each of said sections comprising a helical stator formed of a metal housing having an elastic lining with shaped grooves secured to the inner surface of said housing, and a helical rotor having grooves meshingly engaged with the grooved lining of said stator;
    each of said stators having an axis aligned with the axis of said housing, and each of said engaged rotors having an axis non-aligned with the axis of said housing;
    the stators of adjacent sections being rotatably movable relative to one another from an initial position where the respective axes of adjacent stators are non-aligned to a final position where the respective axes of said stators are aligned to form a common axis during jointing of said stators together;

the helical stator of adjacent sections being rigidly connected directly to one another, and the helical rotor of each adjacent section being rigidly connected directly to one another, the respective axes of said jointed rotor elements being aligned to form a common axis;

said helical stators and rotors of each of said sections forming therebetween cavities having a preselected eccentricity to define cavities of variable volume for the passage of fluid therethrough;

a shaft kinematically linked with said helical rotor of the last of said sections; and means detachably linking each of said adjacent sections rigidly to each other for permitting both relative axial movement between said adjacent sections and relative angular movement during interconnection of said adjacent sections and for providing a rigid interconnection during operation of the machine, said detachable linking means including frictional jointing comprising a recessed portion and a projecting portion receivable within said recessed portion when said adjacent sections are linked together, said projection being in the form of a body of revolution provided at the end of one of said sections and said recessed portion being of a corresponding shape provided at the end of said adjacent section forcibly secured against mutual angular and axial displacements.

10. The helical down-hole machine as defined in claim 9 wherein said projecting portion and said recessed portion are provided at the ends of adjacent rotors of said adjacent sections, said rotors being forcibly secured against displacement during rotation by virtue of a pressure drop acting on the rotors.

11. A helical down-hole machine as defined in claim 9 wherein said projecting portion and said recessed portion are provided at the ends of adjacent stators, means including a common housing for securing said adjacent stators against mutual angular and axial displacements by placing said adjacent stators inside said common housing, and thrust elements at the ends of said common housing interacting with the free ends of the stators, at least one of said thrust elements being capable of axial movement.

12. The helical down-hole machine as defined in claim 10, including a common housing; said projecting portion and said recessed portion being provided at the ends of said adjacent sections and positioned in said common housing; and thrust elements connected with said housing interacting with free ends of said stators, at least one of said thrust elements being axially movable.

13. The helical down-hole machine as defined in claim 12, wherein said thrust elements are axially movable to move said adjacent sections together with said projecting portion and said recessed portion being self-aligned.

14. The helical down-hole machine as defined in claim 11, wherein said thrust elements are axially movable to move said adjacent sections together with said projecting portion and said recessed portion being self-aligned.

15. A helical down-hole machine as defined in claim 13 wherein said projecting portion and said recessed portion are cylindrical in shape.

16. A helical down-hole machine as defined in claim 13 wherein said projecting portion and said recessed portion are shaped as truncated cones.

17. A helical down-hole machine as defined in claim 13 wherein said projecting and recessed portions are each shaped as a cylinder expanding into a truncated cone.

18. A helical down-hole machine as defined in claim 16 wherein the difference between the larger and smaller bases of the truncated cone amounts to at least a value not less than four values of the eccentricity.

19. A helical down-hole machine as defined in claim 17 wherein the difference between the larger and smaller bases to the truncated cone amounts to at least a value not less than four values of the eccentricity.

20. A helical down-hole machine as defined in claim 14, wherein said projecting portions and said recessed portions are complementarily conically-shaped to provide for said frictional jointing of said adjacent sections.

21. A method of assemblying a multistage helical down-hole machine of the kind comprising a plurality of sections each having a helical stator and a helical rotor, said method comprising the steps of:

forming said stator of a metal housing having an elastic lining with shaped grooves;

securing said shaped lining to the inner surface of said housing with the axis of said stator aligned with the axis of said housing;

forming the outer surface of said rotor with grooves adapted to meshingly engage with the grooved lining of said stator, each of said engaged rotors having an axis non-aligned with the axis of said housing;

arranging a plurality of said sections in series axially;

rigidly connecting the helical rotor of each of said sections directly to the helical rotor of the next adjacent one of said sections to form a first set of succeedingly connected helical elements, the respective axes of said jointed rotor elements being aligned to form a common axis;

mounting a stator to each one of said jointed rotors;

rotatably moving the stators of adjacent sections relative to one another from an initial position where the respective axes of adjacent stators are non-aligned to a final position where the respective axes of said stators are aligned to form a common axis during jointing of said stators together;

rigidly connecting the helical stator of each of said sections directly to the helical stator of the next adjacent one of said sections to form a second set of succeedingly connected helical elements, the jointed helical stators and rotors of said sections forming therebetween cavities having a preselected eccentricity of define cavities of variable volume for the passage of fluid therethrough, the connection linking each of said adjacent sections rigidly to each other being detachable through frictionally jointing of a projecting portion within a recessed portion when said adjacent sections are linked together, said projection being in the form of a body of revolution provided at the end of one of said sections and said recessed portion being of a corresponding shape provided at the end of said adjacent section forcibly secured against mutual angular and axial displacements; and kinematically linking a shaft to the helical rotor of the last of said sections.

22. The method as defined in claim 21, further comprising the step of connecting thrust elements with said housing interacting with the free ends of said stators, said thrust elements being axially movable to move adjacent sections together with said projecting portion and said recessed portion being self-aligned.

* * * * *

UNITED STATES PATENT AND TRADEMARK OFFICE
CERTIFICATE OF CORRECTION

PATENT NO. : 4,585,401
DATED : April 29, 1986
INVENTOR(S) : Dmitry F. BALDENKO, et al.

It is certified that error appears in the above—identified patent and that said Letters Patent is hereby corrected as shown below:

IN THE DRAWINGS:

Figs. 3 and 4, change reference numeral "14" to --15--.

Fig. 8, reference numeral "48" should have its lead line changed in accordance with the attached print.

Signed and Sealed this

Fourth Day of November, 1986

[SEAL]

Attest:

Attesting Officer

DONALD J. QUIGG

Commissioner of Patents and Trademarks